United States Patent
Kang et al.

(10) Patent No.: US 8,050,235 B2
(45) Date of Patent: Nov. 1, 2011

(54) APPARATUS AND METHOD OF PROVIDING TRANSPARENT RELAY SERVICE TO MOBILE STATION IN A MULTIHOP RELAY BROADBAND WIRELESS ACCESS (BWA) COMMUNICATION SYSTEM

(75) Inventors: Hyun-Jeong Kang, Seoul (KR); Jae-Weon Cho, Suwon-si (KR); Sung-Jin Lee, Seoul (KR); Mi-Hyun Lee, Seoul (KR); Pan-Yuh Joo, Seoul (KR); Jun-Young Jung, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 937 days.

(21) Appl. No.: 11/647,947

(22) Filed: Dec. 29, 2006

(65) Prior Publication Data

US 2007/0155391 A1 Jul. 5, 2007

(30) Foreign Application Priority Data

Dec. 29, 2005 (KR) .................. 10-2005-0132865

(51) Int. Cl.
*H04W 4/00* (2009.01)

(52) U.S. Cl. ........ 370/333; 370/315; 370/328; 455/423; 455/438

(58) Field of Classification Search ............ 455/7, 436, 455/450, 67.11, 435.2, 422.1, 432.1, 438, 455/444, 515–516, 13.1, 103, 524, 525, 423; 370/315, 329, 246, 331–333, 328
See application file for complete search history.

(56) References Cited

U.S. PATENT DOCUMENTS

| 5,175,867 | A | * | 12/1992 | Wejke et al. | 455/439 |
|---|---|---|---|---|---|
| 2001/0014586 | A1 | * | 8/2001 | Nakatsugawa | 455/13.1 |
| 2001/0021182 | A1 | * | 9/2001 | Wakutsu | 370/344 |
| 2001/0031624 | A1 | * | 10/2001 | Schmutz | 455/13.4 |
| 2001/0038620 | A1 | * | 11/2001 | Stanwood et al. | 370/336 |
| 2002/0031624 | A1 | * | 3/2002 | Worcester | 428/18 |
| 2003/0058816 | A1 | * | 3/2003 | Shearer, III | 370/329 |
| 2006/0035643 | A1 | * | 2/2006 | Vook et al. | 455/450 |

FOREIGN PATENT DOCUMENTS

| EP | 1 156 609 | 11/2001 |
|---|---|---|
| KR | 1020040018525 | 3/2004 |
| KR | 1020050105553 | 11/2005 |
| KR | 1020060057471 | 5/2006 |

* cited by examiner

*Primary Examiner* — Nick Corsaro
*Assistant Examiner* — Quan Hua
(74) *Attorney, Agent, or Firm* — The Farrell Law Firm, P.C.

(57) ABSTRACT

Apparatus and method of providing transparent relay service to a Mobile Station (MS) in a multihop relay Broadband Wireless Access (BWA) communication system. The communication method includes checking, at least one relay station (RS), a sounding channel allocated to an MS by analyzing a message broadcast from a Base Station (BS); measuring, at the BS, an BS-MS signaling level using a sounding signal of the MS, the sounding signal received in the sounding channel; measuring, at the at least one RS, an RS-MS signaling level using a sounding signal of the MS, the sounding signal received in the sounding channel; reporting, at the at least one RS, the RS-MS signaling level measurement value to the BS; and selecting, at the BS, an RS suitable for the MS using the BS-MS signaling level measurement value and at least one RS-MS signaling level measurement value reported from the at least one RS. Accordingly, the BS can select a suitable RS for the MS by taking into account the RS-MS channel status.

28 Claims, 8 Drawing Sheets

APPARATUS AND METHOD OF PROVIDING TRANSPARENT RELAY SERVICE TO MOBILE STATION IN A MULTIHOP RELAY BROADBAND WIRELESS ACCESS (BWA) COMMUNICATION SYSTEM

PRIORITY

This application claims priority under 35 U.S.C. §119 to an application filed in the Korean Intellectual Property Office on Dec. 29, 2005 and assigned Serial No. 2005-0132865, the contents of which are incorporated herein by reference.

BACKGROUND OF THE INVENTION

1. Field of the Invention

The present invention relates generally to a multihop relay broadcast wireless access (BWA) communication system, and in particular, to an apparatus and method of providing transparent relay service to a mobile station in a relay supporting system for cell capacity expansion of a serving cell.

2. Description of the Related Art

In fourth generation (4G) communication systems, research has been conducted to provide users with various Quality of Service (QoS) at a data rate of over 100 Mbps. Specifically, research into the high rate service support to guarantee mobility and QoS in broadband wireless access (BWA) communication systems, such as Local Area Networks (LAN) and Metropolitan Area Networks (MAN), has been under way. Representative systems of the BWA communication system include Institute of Electrical and Electronics Engineers (IEEE) 802.16d and 802.16e communication systems.

IEEE 802.16d and 802.16e communication systems adapt an Orthogonal Frequency Division Multiplexing (OFDM)/Orthogonal Frequency Division Multiple Access (OFDMA) scheme for physical channels. An IEEE 802.16d communication system addresses the stationary or fixed Subscriber Station (SS); that is, an IEEE 802.16d communication system does not take into account the mobility of the SS but the single cell structure. By contrast, an IEEE 802.16e communication system addresses the mobility of the SS, which is updated from the IEEE 802.16d communication system. The mobile SS is referred to as a Mobile Station (MS).

FIG. 1 shows a general IEEE 802.16e communication system which has a multi cell architecture, that is, a cell 100 and a cell 150. The IEEE 802.16e communication system includes a Base Station (BS) 110 managing the cell 100, a BS 140 managing the cell 150, and a plurality of MSs 111, 113, 130, 151, and 153. Signals are transmitted and received between the BSs 110 and 140 and the MSs 111, 113, 130, 151, and 153 using an OFDM/OFDMA scheme. Of the MSs 111, 113, 130, 151, and 153, the MS 130 resides in the overlapping area of the cell 100 and the cell 150; that is, in a handover region. When the MS 130 migrates to the cell 150 managed by the BS 140 while transmitting and receiving signals to and from the BS 110, the serving BS of the MS 130 is changed from the BS 110 to the BS 140.

By signaling through the direct links between the fixed BS and the MSs as shown in FIG. 1, the general IEEE 802.16e communication system can easily configure highly reliable wireless communication links between the BS and the MSs. However, since the position of the BS is fixed, the IEEE 802.16e communication system has low flexibility in the radio network configuration. Thus, it is hard to provide efficient communication services in a radio communication environment suffering severe changes of traffic distribution or traffic demand.

To overcome these shortcomings, a data delivery scheme using a multihop relay having a fixed relay station, a mobile relay station, or general MSs is applicable to a general cellular wireless communication system, such as an IEEE 802.16e communication system. A wireless communication system using a multihop relay scheme can reconfigure the network by promptly coping with the changes of the communication environment and utilize the entire radio network more efficiently. For instance, a multihop relay wireless communication system is able to expand the cell service area and increase system capacity. In detail, under poor channel conditions between a BS and an MS, better radio channel status can be provided to the MS by installing a relay station between the BS and the MS and establishing a multihop relay path via the relay station. Also, by adopting a multihop relay scheme in a cell boundary of a poor channel status from the BS, a high speed data channel can be provided and the cell service area can be expanded.

Hereinafter, descriptions are provided on a structure of a multihop relay wireless communication system for expanding the service area of a BS.

FIG. 2 shows a broadband wireless communication system using a multihop relay scheme for extending the service area of the BS. The multihop relay wireless communication system in FIG. 2 has a multicell architecture, that is, a cell 200 and a cell 240. The multihop relay wireless communication system includes a BS 210 managing the cell 200, a BS 250 managing the cell 240, MSs 211 and 213 located in the cell 200, MSs 221 and 223 managed by the BS 210 but located in an area 230 out of the cell 200, a relay station 220 providing multihop relay paths between the BS 210 and the MSs 221 and 223 in the area 230, MSs 251, 253 and 255 located in the cell 240, MSs 261 and 263 managed by the BS 250 but located in an area 270 out of the cell 240, and a relay station 260 providing multihop relay paths between the BS 250 and the MSs 261 and 263 in the area 270. Signals are transmitted and received among the BSs 210 and 250, the relay stations 220 and 260, and the MSs 211, 213, 221, 223, 251, 253, 261, and 263 using an OFDM/OFDMA scheme.

The MSs 211 and 213 and the relay station 220, which belong to the cell 200, can transmit and receive signals directly to and from the BS 210, whereas the MSs 221 and 223 in the area 230 can not transmit and receive signals directly to and from the BS 210. Hence, the relay station 220 manages the area 230 and relays signals between the BS 210 and the MSs 221 and 223 which are incapable of transceiving signals directly. The MSs 221 and 223 can transceive signals with the BS 210 via the relay station 220. Likewise, the MSs 251, 253 and 255 and the relay station 260, which belong to the cell 240, can transmit and receive signals directly to and from the BS 250, whereas the MSs 261 and 263 in the area 270 can not transmit and receive signals directly to and from the BS 250. Hence, the relay station 260 manages the area 270 and relays signals between the BS 250 and the MSs 261 and 263 which are incapable of transceiving signals directly. The MSs 261 and 263 can transmit and receive signals to and from the BS 250 via the relay station 260.

FIG. 3 shows a broadband wireless communication system using a multihop relay scheme for expanding the system capacity. The multihop relay wireless communication system in FIG. 1 includes a BS 310, MSs 311, 313, 321, 323, 331 and 333, and relay stations 320 and 330 which provide multihop relay paths between the BS 310 and the MSs 311, 313, 321, 323, 331 and 333. Signals are transmitted and received among the BS 310, the relay stations 320 and 330, and the MSs 311, 313, 321, 323, 331 and 333 according to the OFDM/OFDMA scheme. The BS 310 manages a cell 300. The MSs 311, 313, 321, 323, 331 and 333 and the relay stations 320 and 330, belonging to the cell 300, are capable of transmitting and receiving signals directly to and from the BS 310.

However, when some MSs 321, 323, 331 and 333 reside close to the boundary of the cell 300, a Signal-to-Noise Ratio (SNR) of the direct links between the BS 310 and the some MSs 321, 323, 331 and 333 may lower. Thus, the relay station 320 relays the unicast traffics of the BS 310 and the MSs 321 and 323, and the MSs 321 and 323 transmit and receive the unicast traffics to and from the BS 310 via the relay station 320. Likewise, the relay station 330 relays the unicast traffics of the BS 310 and the MSs 331 and 333, and the MSs 331 and 333 transmit and receive the unicast traffics to and from the BS 310 via the relay station 330. That is, the relay stations 320 and 330 raise the effective data rate of the MSs and increase the system capacity by providing high-speed data delivery paths to the MSs 321, 323, 331 and 333.

In a broadband wireless communication system using a multihop relay scheme of FIG. 2 or 3, the relay stations 220, 260, 320 and 330 may be infrastructure relay stations which are installed by a service provider and already known to the BSs 210, 250 and 310 for management, or client relay stations which serve as subscriber stations (e.g., SSs or MSs) in some cases and relay stations in other cases. The relay stations 220, 260, 320 and 330 may be fixed relay stations, nomadic relay stations (e.g., notebook computers), or mobile relay stations such as MSs.

As discussed above, in a multihop relay wireless communication system, an RS is a relay station for cell expansion, which supports the relay between an MS outside a BS region and a BS, or a relay station for cell capacity increase, which supports the relay between an MS within the BS region and the BS.

In the mean time, when utilizing an RS for cell area expansion or a cell capacity increase, a relay service of the RS can be provided while not informing the MS of the presence of the RS; that is, by making the MS recognize the data transmission and reception with the BS. This is referred to as a transparent relay. To provide a transparent relay to the MS, a new signaling process should be defined between the BS and the RS. Primarily, it is desired to define a signaling process of selecting an RS.

SUMMARY OF THE INVENTION

An object of the present invention is to substantially solve at least the above problems and/or disadvantages and to provide at least the advantages below. Accordingly, an object of the present invention is to provide an apparatus and method of servicing a transparent relay to an MS in a multihop relay BWA communication system.

Another object of the present invention is to provide an apparatus and method of selecting an RS which is to provide relay service to an MS in a multihop relay BWA communication system.

A further object of the present invention is to provide an apparatus and method of selecting an RS which is to provide relay service to an MS by taking account of a channel status between the RS and the MS in a multihop relay BWA communication system.

According to one aspect of the present invention, a communication method of a BS in a multihop relay BWA communication system includes sending a message to allocate a sounding channel, to a MS; measuring a BS-MS signaling level using a sounding signal of the MS, the sounding signal received in the allocated sounding channel; receiving a report of a RS-MS signaling level measurement value acquired using the sounding signal of at least one RS; and selecting an RS suitable for the MS using the BS-MS signaling level measurement value and the RS-MS signaling level measurement value.

According to another aspect of the present invention, a communication method of an RS in a multihop relay BWA communication system includes checking a sounding channel allocated to an MS by analyzing a message broadcast from a BS; measuring an RS-MS signaling level using a sounding signal of the MS, the sounding signal received in the sounding channel; and reporting the RS-MS signaling level measurement value to the BS.

According to a further aspect of the present invention, a communication method in a multihop relay BWA communication system includes checking, at least one RS, a sounding channel allocated to an MS by analyzing a message broadcast from a BS; measuring, at the BS, an BS-MS signaling level using a sounding signal of the MS, the sounding signal received in the sounding channel; measuring, at the at least one RS, an RS-MS signaling level using a sounding signal of the MS, the sounding signal received in the sounding channel; reporting, at the at least one RS, the RS-MS signaling level measurement value to the BS; and selecting, at the BS, an RS suitable for the MS using a BS-MS signaling level measurement value and at least one RS-MS signaling level measurement value reported from the at least one RS.

According to a further aspect of the present invention, a communication apparatus in a multihop relay BWA communication system includes at least one RS which checks a sounding channel allocated to an MS, measures an RS-MS signaling level using a sounding signal of the MS, the sounding signal received in the sounding channel, and reports the RS-MS signaling level to an BS; and the BS which measures a BS-MS signaling level using a sounding signal of the MS, the sounding signal received in the sounding channel, and selects an RS suitable for the MS using a BS-MS signaling level measurement value and at least one RS-MS signaling level measurement value reported from the at least one RS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention selects a Relay Station (RS) for providing transparent relay services to a Mobile Station (MS) in a Broadband Wireless Access (BWA) communication system using a multihop relay scheme. According to the present invention, the RS measures a signaling level by recognizing a sounding signal transmitted from an MS and reports the measured signaling level to a Base Station (BS). The BS selects a serving station to provide services to the MS using its measured BS-MS signaling level and the RS-MS signaling level reported from the RS. As such, without making the MS recognize the presence of the RS, the present invention provides a method of selecting an RS suitable for the MS through the RS-BS signaling process.

While an Orthogonal Frequency Division Multiplexing (OFDMA) or Orthogonal Frequency Division Multiplexing Access (OFDMA) communication system is described as a multihop relay BWA communication system, the present invention is not limited to this system, and is applicable to other general multi-carrier communication systems. Using a OFDM/OFDMA scheme, a multihop relay BWA communication system can achieve rapid data transmission and support mobility of a MS by means of a multi-cell architecture by transmitting physical channel signals using a plurality of subcarriers.

In the multihop relay BWA communication system, an RS may be a fixed or mobile node, a specific system installed by a provider, or a general SS. In other words, a node having the above feature can be selected as the RS based on RS capability negotiation with the BS.

Figure 1:
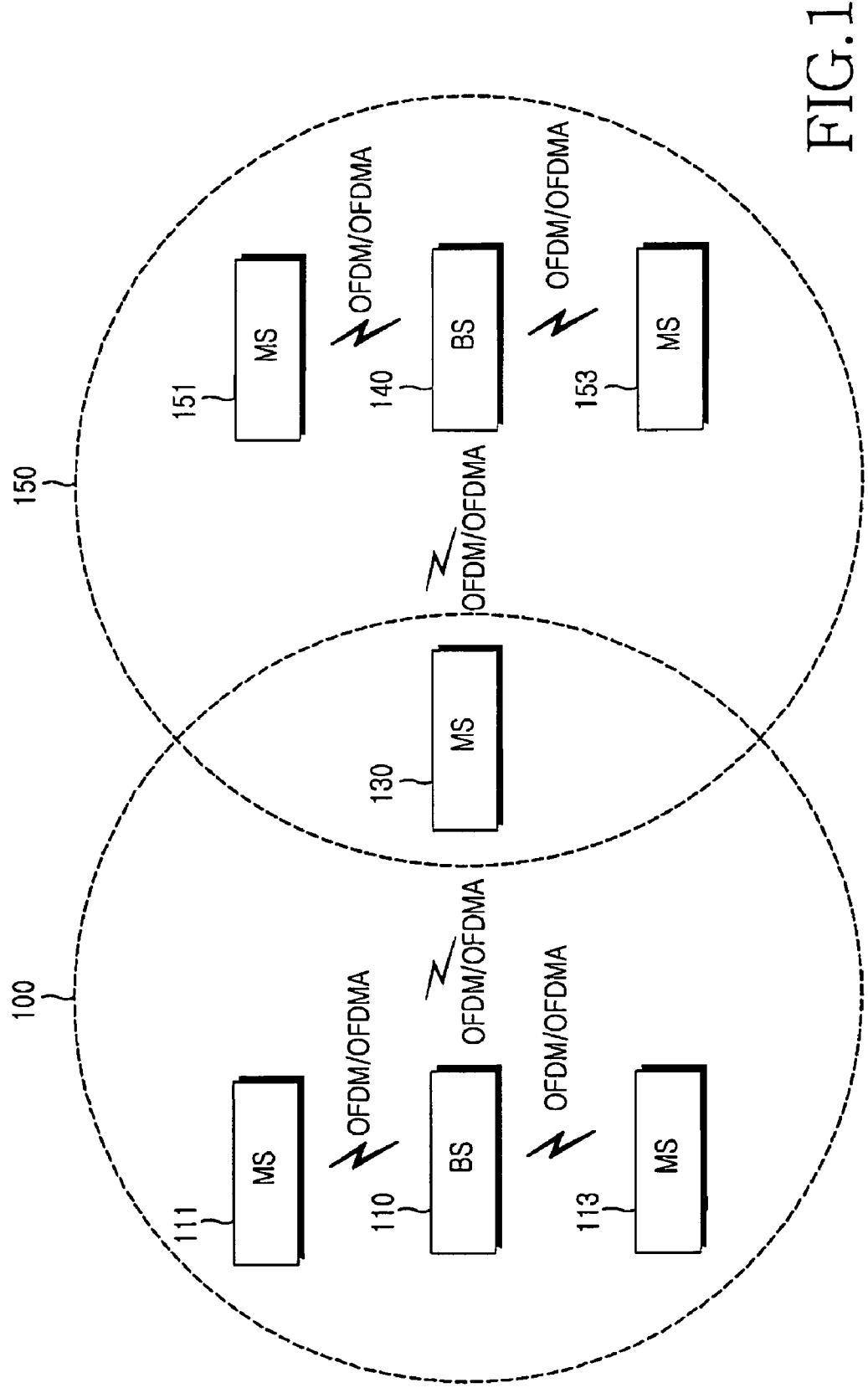
FIG. 1 is a schematic diagram of a general IEEE 802.16e communication system.
Figure 2:
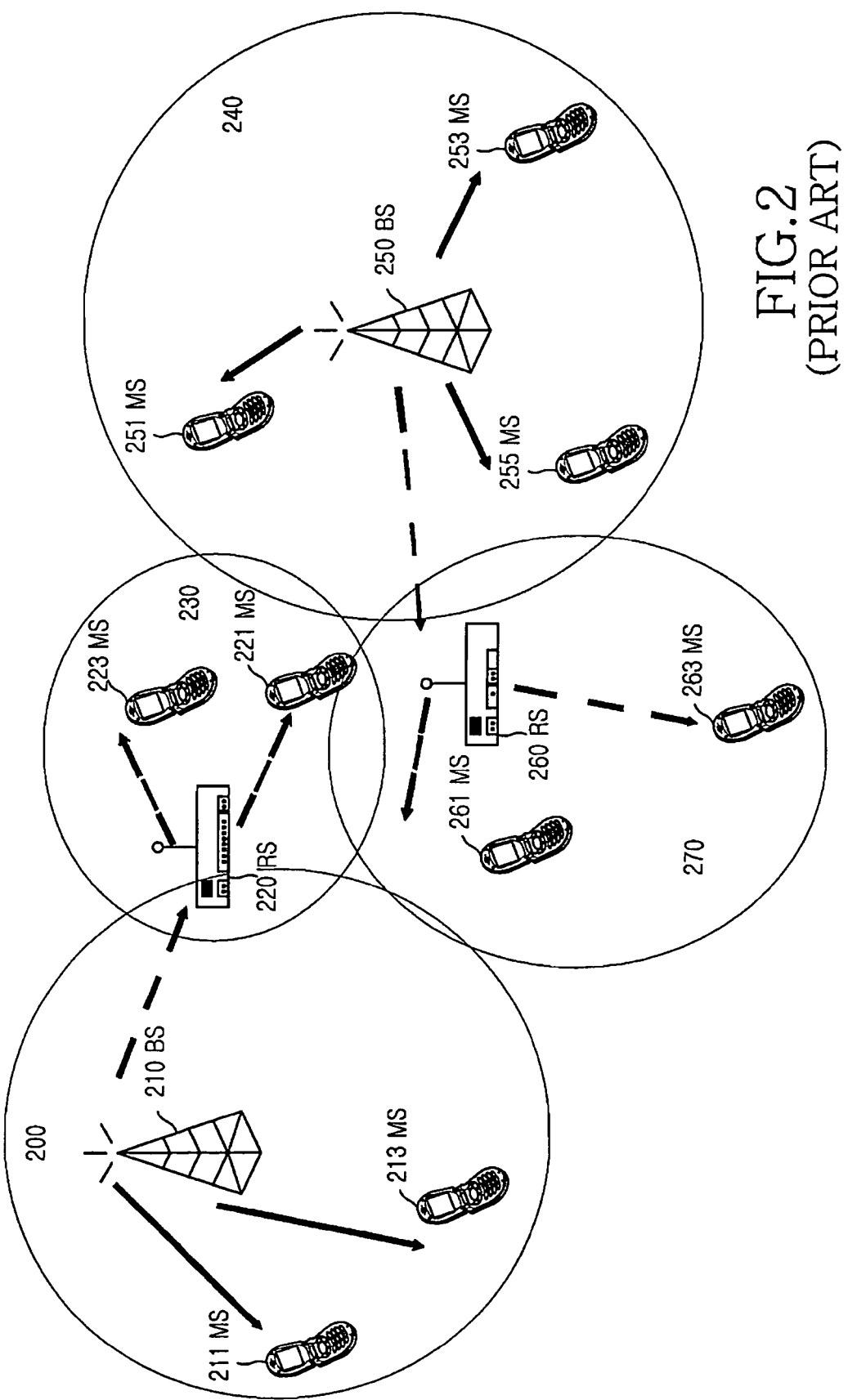
FIG. 2 is a schematic diagram of a multihop relay broadband wireless communication system to expand a service area of a BS.
Figure 3:
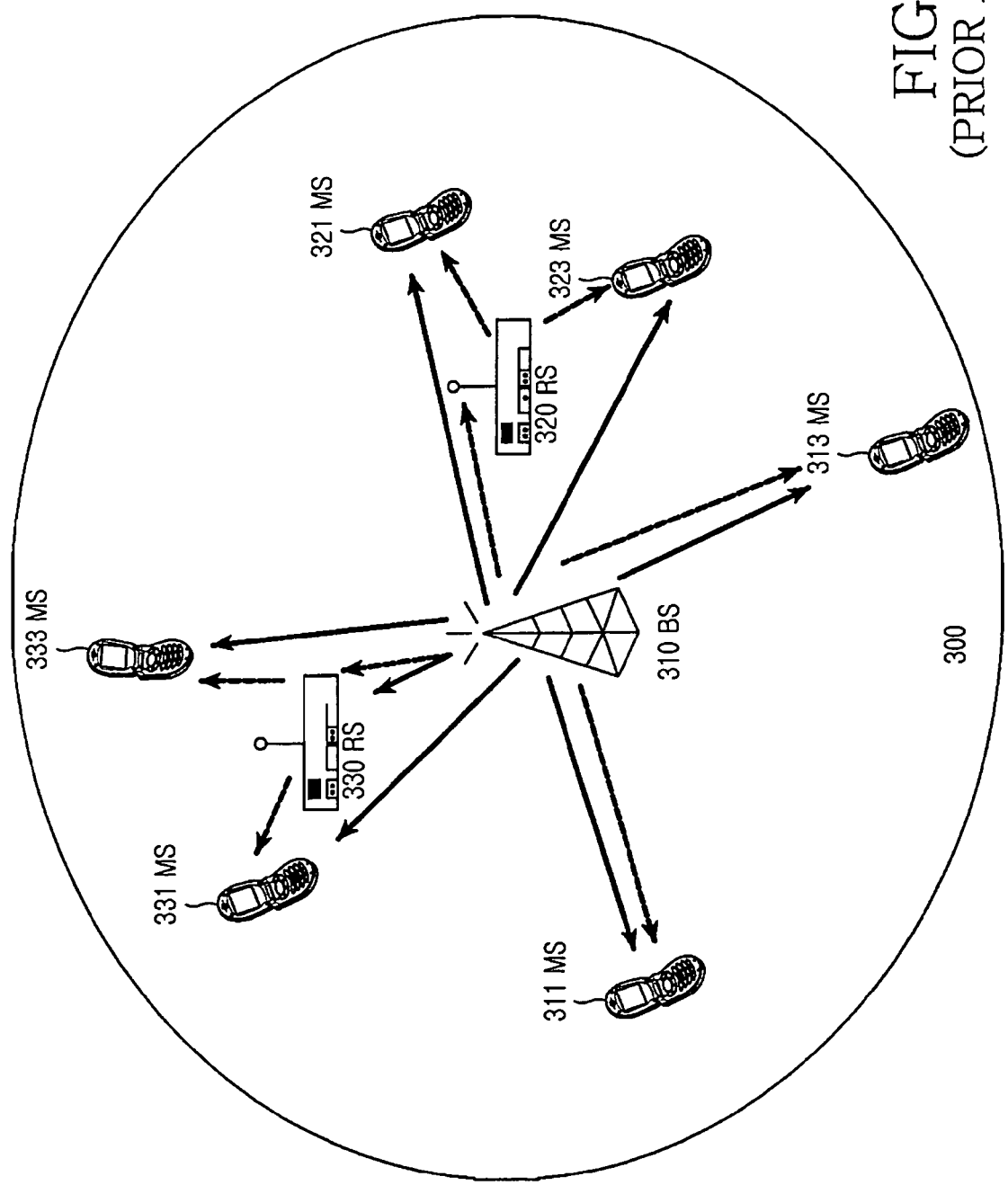
FIG. 3 is a schematic diagram of a multihop relay broadband wireless communication system to increase system capacity.
Figure 4:
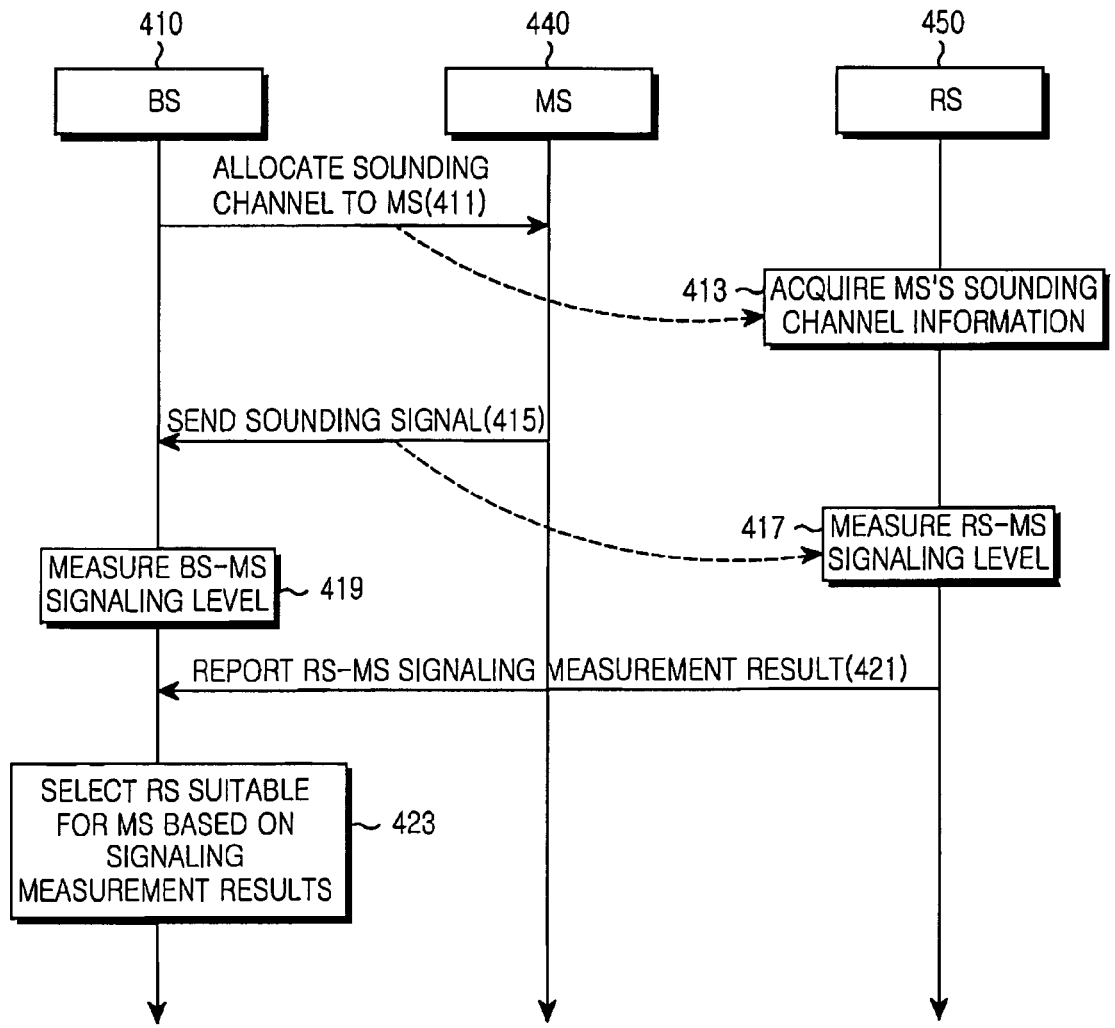
FIG. 4 is a diagram of signal flow between a BS, an RS, and an MS to provide transparent relay services to the MS in a multihop relay broadband wireless communication system according to the present invention.

FIG. 4 shows signal flow between a BS, an RS, and an MS to provide transparent relay services to the MS in a multihop relay broadband wireless communication system according to the present invention. In step 411, the BS 410 allocates a sounding channel zone to the MS 440. The sounding channel zone information is expressed as Peak to Average Power Ratio (PAPR)_Reduction_Safety_and_Sounding_Zone_AllocationIE( ) corresponding to Uplink Interval Usage Code (UIUC)=13 of Uplink-Media Access Protocol Information Element (UL-MAP IE) transmitted from the BS 410.

The PAPR_Reduction_Safety_and_Sounding_Zone_Allocation_IE structure is shown in Table 1.

TABLE 1

| Syntax | Size (bits) | Notes |
|---|---|---|
| PAPR_Reduction_Safety_and_Sounding_Zone_Allocation_IE( ){ | | |
|   OFDMA symbol offset | 8 | |
|   Subchannel offset | 7 | |
|   No.OFDMA symbols | 7 | |
|   No.subchannels | 7 | |
|   PAPR Reduction/safety Zone | 1 | 0=PAPR reduction allocation<br>1=Safety zone Allocation |
|   Sounding Zone | 1 | 0=PAPR/safety Zone<br>1=Sounding Zone Allocation |
|   Reserved | 1 | Shall be set to zero |
| } | | |

In Table 1, the information of the PAPR_Reduction_Safety_and_Sounding_Zone_Allocation_IE is now explained. 'OFDMA symbol offset' indicates a symbol offset of the sounding channel zone, 'Subchannel offset' indicates a subchannel offset of the sounding channel zone, 'No.subchannels' indicates the number of allocated subchannels, 'No.OFDMA symbols' indicates the number of allocated OFDMA symbols, and 'Sounding Zone' indicates whether the zone is allocated for PAPR/Safety Zone or sounding zone.

The BS 410 transmits UL_Sounding_Command_IE( ) to direct a sounding signal transmission method of the MS in the sounding zone allocated based on Table 1.

The UL_Sounding_Command_IE structure is shown in Table 2.

TABLE 2

| Syntax | Size (bits) | Notes |
|---|---|---|
| UL_Sounding_Command_IE( ){ | | |
|   Extended-2 UIUC | 4 | UL_sounding_command_IE( ) = 0x04 |
|   Length | 8 | variable |
|   Sounding_Type | 1 | 0=Type A<br>1=Type B |
|   Send Sounding Report Flag | 1 | |
|   Sounding_Relevance_Flag | 1 | 0=Sounding relevance is the same for all CIDs<br>1=Sounding relevance is specified for each CID |
|   If(Sounding_Relevance_Flag==0){ | | |
|     Sounding_Relevance | 1 | 0=All CIDs respond in the frame carrying the instruction<br>1=All CIDs respond in next frame |

TABLE 2-continued

| Syntax | Size (bits) | Notes |
|---|---|---|
|   reserved | 2 | Shall be set to zero |
| } else { | | |
|   reserved | 3 | Shall be set to zero |
| } | | |
| Include additional feedback | 2 | 0b00=No additional feedback<br>0b01=include channel coefficients (See 8.4.6.2.7.3)<br>0b10=include received pilot coefficients<br>0b11=include feedback message |
| if (Sounding_Type==0) { | | |
|   Num_Sounding_symbols | 3 | Total number of sounding symbols being allocated, from 1 (0b000) to $2^3=8$ (0b111) |
|   Separability Type | 1 | 0: occupy all subcarriers in the assigned bands;<br>1: occupy decimated subcarriers |
|   if(Separability type==0) { | | (using cyclic shift separability) |
|     Max Cyclic Shift Index P | 3 | 0b000: P=4;<br>0b001: P=8;<br>0b010: P=16;<br>0b011: P=32;<br>0b100: P=9;<br>0b101: P=18;<br>0b110-0b111: reserved, |
|     reserved | 1 | Shall be set to zero. |
|   } else { | | (using decimation separability) |
|     Decimation Value D | 3 | Sound every $D^{th}$ subcarrier within the sounding allocation. Decimation value D is 2 to the power of (1 plus this value), hence 2, 4, 8, up to maximum of 128, and 0b111 means decimation of 5. |
|     Decimation offset randomization | 1 | 0= no randomization of decimation offset<br>1= decimation offset pseudo-randomly determined |
|   } | | |
| } | | |
| for (i=0;i<Num_Soudning_symbols;i++){ | | |
|   Sounding symbols index | 3 | Symbol index within the Sounding Zone, from 1 (value 0b000) to $2^3 = 8$ (value 0b111) |
|   Number of CIDs | 6 | Number of CIDs sharing this sounding allocation |
|   reserved | 3 | Shall be set to zero |
|   for (j=0;j<Num. of CIDs;j++) { | | |
|     Shorted basic CID | 12 | 12 LSBs of the MS basic CID value |
|     Power Assignment Method | 2 | 0b00= equal power;<br>0b01 = reserved;<br>0b10= Interference dependent. Per subcarrier power limit;<br>0b11= Interference dependent. Total power limit. |
|     Power boost | 1 | 0= no power boost<br>1= power boost |
|     Multi-Antenna Flag | 1 | 0= MS sounds first antenna only<br>1= MS sounds all antennas |
|     Allocation Mode | 1 | 0: Normal<br>1: Band AMC |
|     If (Allocation Mode == 1) { | | |
|       Band bit Map | 12 | See logical band defined in 6.3.18. |
|       reserved | 2 | Shall be set to zero. |
|     } Else { | | |
|       Starting Frequency Band | 7 | Out of 96 bands at most (FFT size dependent) |
|       Number of frequency bands | 7 | Contiguous bands used for sounding |
|     } | | |
|     If (Sounding Relevance Flag==1) { | | |
|       Sounding_Relevance | 1 | |
|     } else { | | |
|       reserved | 1 | Shall be set to zero. |
|     } | | |
|     if (Separability Type == 0) { | | |
|       Cyclic time shift index m | 5 | Cyclically shifts the time domain symbol by multiples (from 0 to P−1) of N/P where N=FFT size, and P=Max Cyclic Shift Index. |
|     } else { | | |
|       Decimation Offset d | 6 | Relative starting offset position for the first sounding occupied subcarrier in the sounding allocation |
|     } | | |
|     If (Include additional feedback == 0b01) { | | |
|       Use same symbol for additional feedback | 1 | 0= the additional feedback is sent in the symbol(s) following the allocated sounding symbol |

TABLE 2-continued

| Syntax | Size (bits) | Notes |
|---|---|---|
| | | 1= the additional feedback is sent in the same symbol as the allocated sounding symbol |
|     reserved | 2 | Shall be set to zero. |
|   } else { | | |
|     reserved | 3 | Shall be set to zero. |
|   } | | |
| } | | |
| Periodicity | 3 | 0b000= single command, not periodic, or terminate periodicity. Otherwise, repeat sounding once per r frames, where $r = 2^{(n-1)}$, where n is the decimal equivalent of the periodicity field |
|   } | | |
| } | | |
| } else { | | |
|   Permutation | 3 | 0b000= PUSC perm. <br> 0b001= FUSC perm <br> 0b010= Optional FUSC perm. <br> 0b011= PUSC-ASCA <br> 0b100= TUSC1 <br> 0b101= TUSC2 <br> 0b110= AMC (2 × 3) <br> 0b111= Reserved |
|   DL_PermBase | 6 | |
|   Num_Sounding_symbols | 3 | |
|   for (i=0;i<Num_Sounding_symbols;i++){ | | |
|     Number of CIDs | 7 | |
|     reserved | 1 | Shall be set to zero. |
|     for (j=0;j<Number of CIDs;j++) { | | |
|       Shortened basic CID | 12 | 12 LSBs of the MS basic CID value |
|       If(Sounding_Relevance_Flag==1){ | | |
|         Sounding_Relevance | 1 | 0= Respond in the frame carrying the instruction <br> 1= Respond in next frame |
|       reserved | 3 | Shall be set to zero. |
|       } | | |
|       Subchannel offset | 7 | The lowest index subchannel used for carrying the burst, starting from subchannel 0 |
|       Power boost | 1 | 0= no power boost <br> 1= power boost |
|       Number of subchannels | 3 | The number subchannels with subsequent indexes, used to carry the burst. |
|       Periodicity | 3 | 0b000= single command, not periodic, or terminate periodicity. Otherwise, repeat sounding once per r frames, where $r = 2^{(n-1)}$, where n is the decimal equivalent of the periodicity field |
|         Power Assignment Method | 2 | 0b00= equal power; <br> 0b01 = reserved; <br> 0b10= Interference dependent. Per subcarrier power limit; <br> 0b11 = Interference dependent. Total power limit. |
|       } | | |
|     } | | |
|   } | | |
|   Padding | variable | Pad IE to octet boundary. Bits shall be set to 0 |
| } | | |

Information of the UL_Sounding_Command_IE (Information Element) in Table 2 are now described. 'Extended-2 UIUC (Uplink Interval Usage Code) of UL_Sounding_Command_IE is set to a value of '0x04' indicating the UL_Sounding_Command. 'Sounding_Type' indicates a sounding zone allocation type. Sounding type 'A' directs the MS to transmit a specific sounding signal in a specific sounding symbol interval and includes specific sounding frequency band information occupied by the sounding symbol. As for the Sounding type 'A', since sounding signals transmitted by a plurality of MSs may occupy the same frequency band, cyclic shift information or decimation information should be contained to distinguish the sounding signals of the MSs. In case of Sounding type 'B', frequency bands are separately allocated to the respective MSs. In this case, to match the downlink (DL) subchannel structure, DL permutation information should be contained. 'Sounding Relevance' information is carried, indicating CID information of the MS which has the allocated sounding zone and transmits the sounding signal, and indicating whether each MS sends the sounding signal in the same frame or the next frame of the UL_Sounding_Command_IE. Also, 'periodicity' information is carried, which directs the MS to periodically send the sounding signal.

Meanwhile, in step 413, the RS 450 acquires sounding channel zone allocation information which is transmitted from the BS 410 to the MS 440 in UL-MAP. That is, the RS 450 can obtain CID information of each MS and sounding zone information allocated to each MS.

Next, the MS 440 sends a sounding signal in the allocated sounding channel zone as directed in Table 1 and Table 2 in step 415. In doing so, as knowing the sounding channel zone allocated to the MS 440, the RS 450 can receive the sounding signal from the MS 440.

In step 417, the RS 450 measures an RS-MS signaling level by receiving the sounding signal from the MS 440 in the sounding channel zone. The signaling level can be a Signal to Interference and Noise Ratio (SINR) or a Received Signal Strength Indicator (RSSI). In step 419, the BS 410 measures a BS-MS signaling level by receiving the sounding signal from the MS 440.

In step 421, the RS 450 reports the measured RS-MS signaling level information to the BS 410. While the single RS 450 reports the RS-MS signaling information to ease the understanding, other RSs, which know the sounding channel information allocated to the MS 440, can report their measured RS-MS signaling level information to the BS 410. Next, the BS 410 selects an RS suitable for the MS 440 using its measured BS-MS signaling level information and the RS-MS signaling level information received from the RS 450 in step 423. Accordingly, without recognizing the RS 450, the MS 440 can receive services from the RS 450.

The BS selection process for an RS suitable for the MS using the BS-MS signaling level information and the RS-MS signaling level information, selects an RS capable of providing the best channel status from the BS to the MS by way of example. Since the BS selection process for an RS lies out of scope of the invention, its detailed explanation is not discussed.

Now, detailed descriptions are made on an operation of the RS to report the RS-MS signaling level measurement result to the BS.

Figure 5:
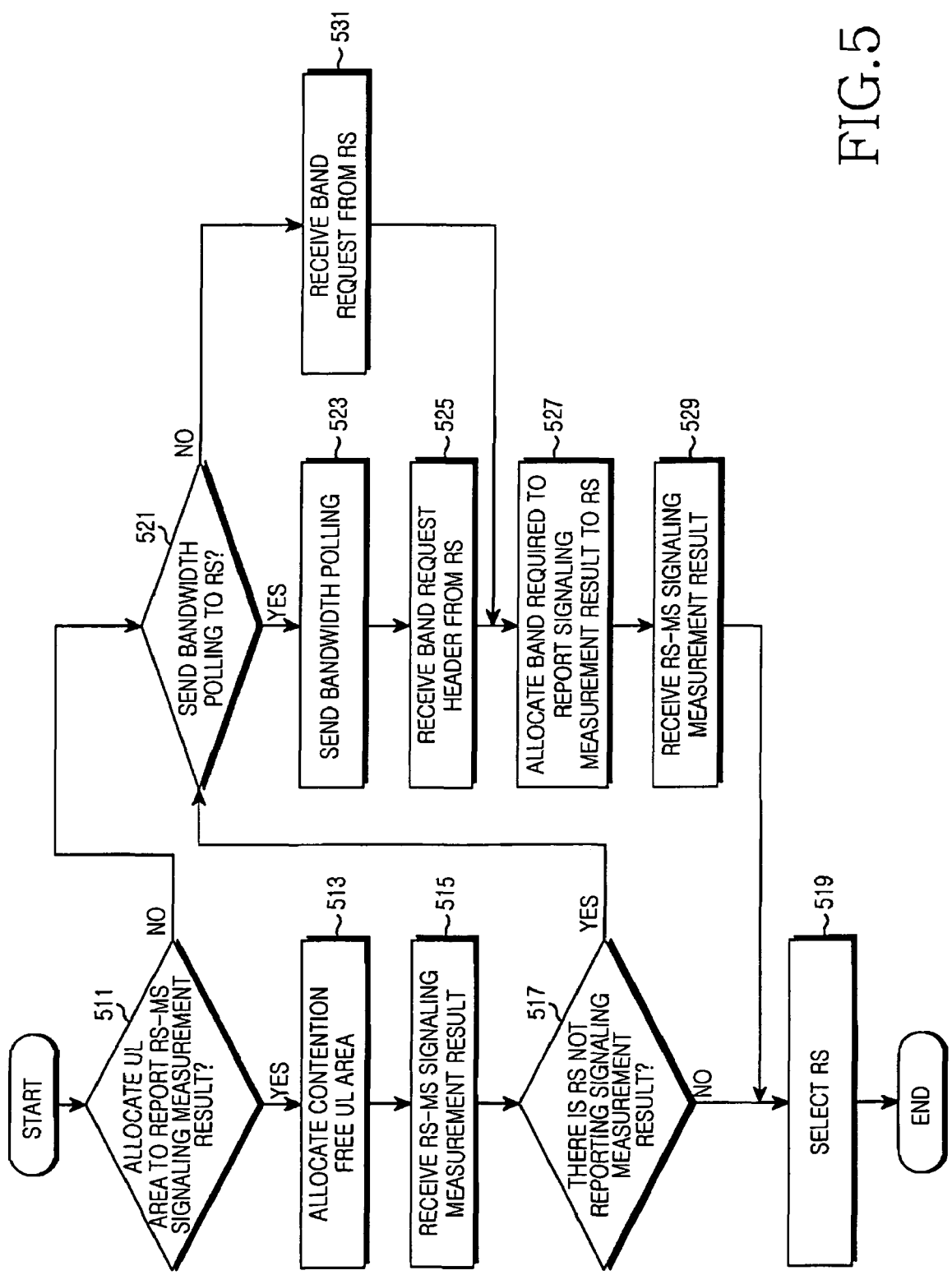
FIG. 5 is a flowchart of an operation of a BS which receives an RS-MS signaling level in the multihop relay broadband wireless communication system according to the present invention.

FIG. 5 shows an operation of a BS which receives an RS-MS signaling level in the multihop relay broadcast wireless communication system according to the present invention. The BS determines whether to allocate a contention free UL area for reporting the RS-MS signaling level measurement result, to the RS in step 511. When allocating the contention free UL area, the BS allocates an UL link area (or resource) for reporting the RS-MS signaling level measurement result in step 513. The UL area allocation can be allocated as the basic UL-MAP IE. According to the present invention, a separate RS_MS_Signal_Report_IE is defined using the remaining values of Extended 2-UIUC.

The RS_MS_Signal_Report_IE structure is shown in Table 3.

TABLE 3

| Syntax | Size | Motes |
| --- | --- | --- |
| RS_MS_Signal_Report_IE( ) { | | |
| Extended-2 UIUC | 4 bits | RS_MS_Signal_Report_IE( )=0x05 |
| CID | 16 bits | RS CID |
| duration | 6 bits | indicates the duration, in units of OFDMA slots, of the allocation. |
| reserved | 6 bits | reserved; shall be set to zero |
| } | | |

Information of the RF_MS_Signal_Report_IE described in Table 3 are now explained. 'Extended-2 UIUC' is set to '0x05' indicating it is 'RS_MS_Signal_Report'. 'CID' indicates basic Connection Identifier (CID) information of the RS to which the UL area is allocated. 'duration' indicates information as to the area allocated to the RS to transmit the RS-MS signaling level measurement result.

Next, in step 515, the BS receives the RS-MS signaling level measurement result from the RS in the allocated contention free UL area.

Table 4 shows a structure example of an RS_MS_Signal_Report message transmitted by the RS to report the RS-MS signaling level measurement result.

TABLE 4

| Syntax | Size | Notes |
| --- | --- | --- |
| RS_MS_Signal_Report_Message_format( ) { | | |
| Management message type = TBD | 8 | to be determined |
| N_MSs | 8 | number of MSs reported in this message |
| for(i=0; i<N_MSs; i++) { | | |
| MS CID | 16 | MS connection identifier |
| MS-RS signal strength level | 8 | |
| } | | |
| } | | |

As shown in Table 4, the RS_MS_Signal_Report message includes type information of the transmitted message (Management message type), the number of MSs reported by the RS (N_MSs), basic CID information of each MS, and RS-MS signaling level measurement value information (MS-RS signal strength level). The signaling level measurement value can use an SINR value, an RSSI value, or the like.

As such, the BS receives an RS-MS signaling measurement result report messages (see Table 4) from the corresponding RSs. In step 517, the BS checks whether there is an RS which does not report the signaling measurement result. When all of the RSs have reported the measurement result, the BS selects an RS which will provide service to the MS using the received RS-MS signaling level measurement values in step 519. When there is an RS not reporting the signaling measurement result, the BS proceeds to step 521.

In the mean time, when the contention free UL area is not separately allocated for reporting the RS-MS signaling level measurement value in step 511 or when there is an RS not reporting the RS-MS signaling level measurement value in the contention free UL area allocated in step 517, the BS determines whether to send a bandwidth polling to the RSs in step 521.

By determining to send the bandwidth polling, the BS sends the bandwidth polling to each RS to make the RSs request the band allocation for reporting the RS-MS signaling level measurement value in step 523. In step 525, the BS receives a band request header from the RS. Upon receiving the band request header, the BS allocates to the corresponding RS an UL area which is required to report the signaling measurement result in step 527. Next, the BS receives an RS-MS signaling measurement result report message (see Table 4) from the RS in step 529 and proceeds to step 519.

When a contention bandwidth allocation request is transmitted according to the determination of the RS, the BS receives a band request header (a band request code) from the RS in step 531. Upon receiving the band request header, the BS allocates an UL area for reporting the signaling measurement result to the corresponding RS in step 527, receives an RS-MS signaling measurement result report message (see Table 4) from the RS in step 529, and proceeds to step 519.

The band request header received from the RS to the BS in step 525 or 531 may use a general bandwidth request header. Alternatively, a new band request header (RS-MS signal report extended subheader) can be defined as shown in Table 5.

Table 5 shows a structure example of the RS-MS signal report extended subheader.

TABLE 5

| Name | Size (bits) | Description |
| --- | --- | --- |
| MS number | 8 | The number of MSs which RS reports the signaling measurement result |

In Table 5, the RS-MS signal report extended subheader includes information relating to the number of MSs reported when the RS reports the RS-MS signaling measurement value to the BS. Thus, the BS, receiving the RS-MS signal report extended subheader, acquires the RS-MS signaling measurement result report quantity and allocates the corresponding UL area to the RS.

The RS-MS signaling level measurement result received from the RS to the BS in step 515 or 529 may be a Media Access Control (MAC) layer management message such as an RS_MS_Signal_Report message of Table 4. Alternatively, it can be a code sequence which combines the MS ID information and the RS-MS signaling level measurement value. The code sequence construction including the RS-MS signaling level measurement value departs from the spirit of the present invention and will not be further described.

Figure 6:
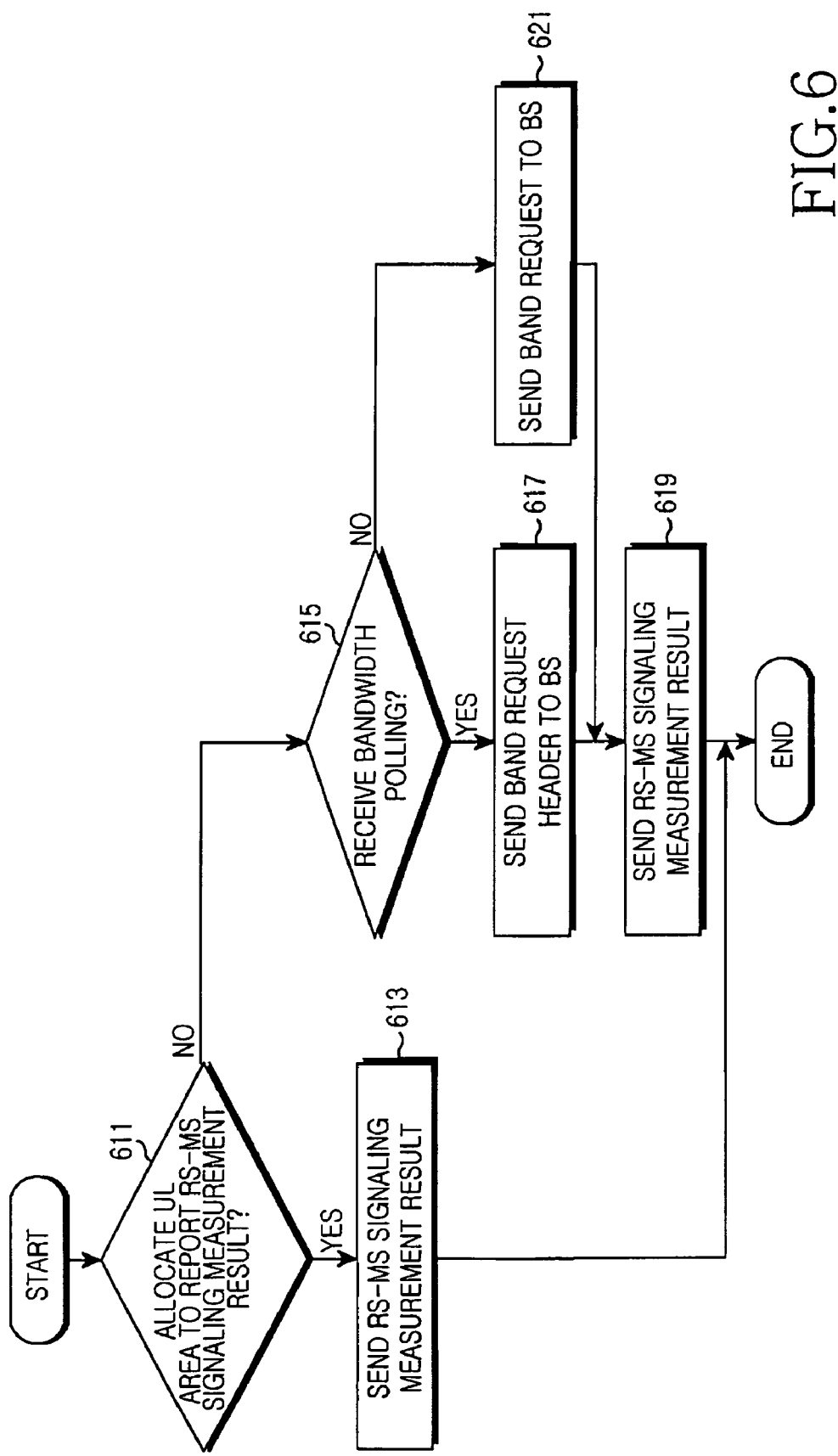
FIG. 6 is a flowchart of an operation of the RS which reports the RS-MS signaling level to the BS in the multihop relay broadband wireless communication system according to the present invention.

FIG. 6 shows an operation of the RS which reports the RS-MS signaling level to the BS in the multihop relay broadcast wireless communication system according to the present invention. The RS checks whether a contention free UL area is allocated to report the RS-MS signaling measurement result in step 611. In more detail, when a separate contention free UL area is allocated using the message of Table 3, the RS reports the RS-MS signaling measurement result to the BS by sending the RS_MS_Signal_Report message (see Table 4) in the allocated area in step 613.

By contrast, when the contention free UL area is not allocated, the RS waits to receive a bandwidth polling from the BS in step 615. Receiving the bandwidth polling, the RS sends to the BS a band request header which requests an UL area allocation to transmit the RS-MS signaling measurement result in step 617. Next, in step 619, the RS receives the allocated UL area and transmits an RS_MS_Signal_Report message (see Table 4) to the BS in the allocated UL area. That is, the RS reports the RS-MS signaling measurement result to the BS.

When not receiving the bandwidth polling from the BS in step 615 or when requesting the contention based allocation according to the RS's determination, the RS sends a band request code and a band request header, which request the UL area allocation, to the BS in step 621. Next, the RS receives the allocated UL area and reports the RS-MS signaling measurement result by sending the RS_MS_Signal_Report message (see Table 4) to the BS in the allocated UL area in step 619.

The band request header transmitted from the RS to the BS in step 617 or 621 can be a general bandwidth request header. Alternatively, the band request header can be an RS-MS signal report extended subheader as defined in Table 5.

The RS-MS signaling level measurement result transmitted from the RS to the BS in step 613 or 619 can be a MAC layer management message such as RS_MS_Signal_Report message of Table 4, or a code sequence which combines the MS ID information and the RS-MS signaling level measurement value.

According to the present invention, descriptions have explained the RS selection to support the transparent relay service to the MS which communicates directly with the BS. Even when the service is being provided to the MS via the RS, to discover a suitable RS for the MS incessantly, the RS-MS signaling level should be reported to the BS continually.

Figure 7:
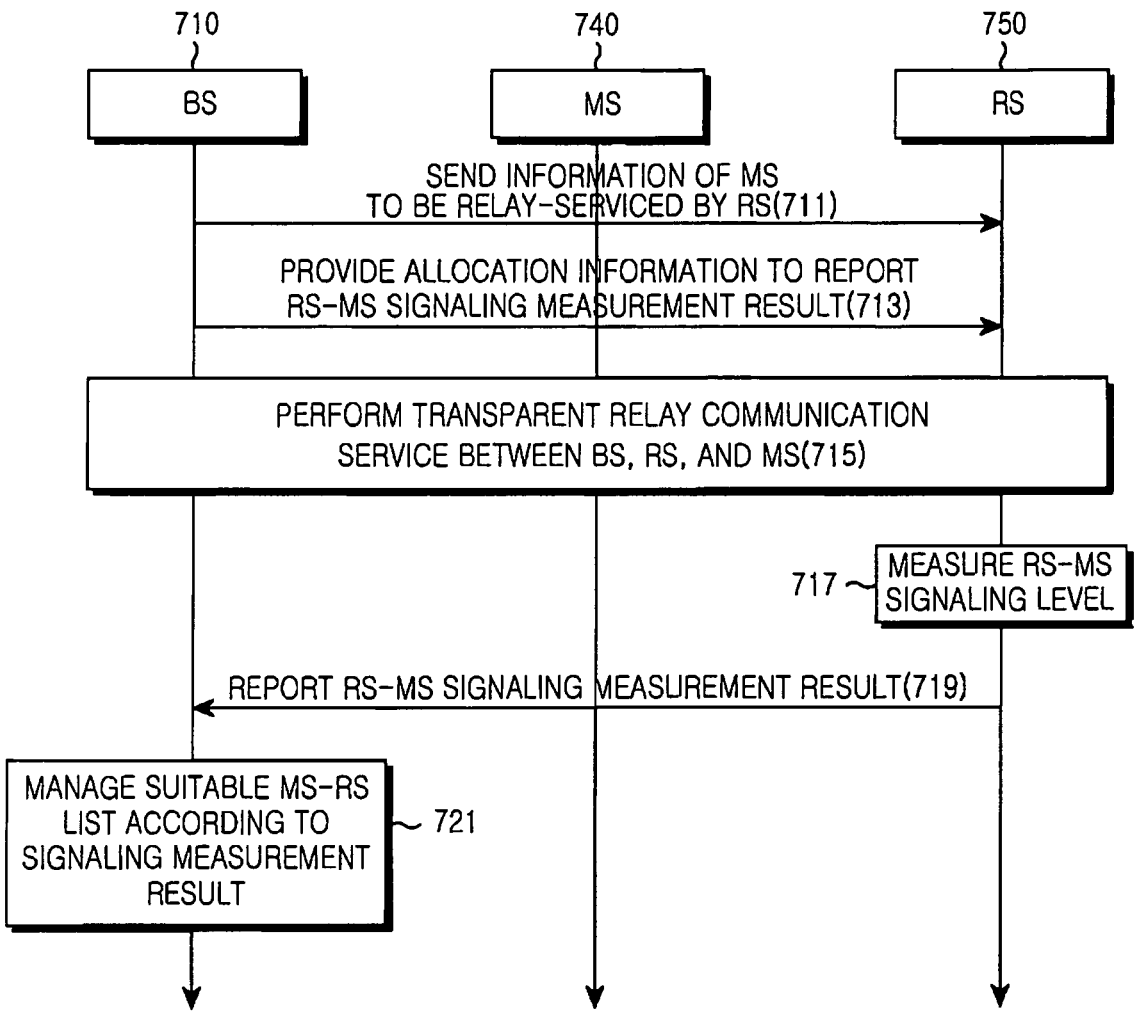
FIG. 7 is a diagram of signal flow for the RS to report a channel status with its managing MS to the BS in the multihop relay broadband wireless communication system according to the present invention.

FIG. 7 shows signal flow for an RS 750 to report a channel status with its managing MS 740 to a BS 710 in a multihop relay broadcast wireless communication system according to the present invention. The BS 710 selects RS 750 suitable for an MS 740 using the RS-MS signaling level measurement results reported from the RSs as described above and sends information of the MS 740 to be relay-serviced, to the selected RS 750 in step 711.

In step 713, the BS 710 allocates an UL area which enables to continuously monitor the channel status of the MS 740 managed by the RS 750 and to report the relevant signaling measurement result. The UL area can be allocated to the RS 750 using the RS_MS_Signal_Report IE of Table 3, the Channel Quality Indication Channel (CQICH) zone, or the basic UL-MAP IE.

Next, in step 715, the BS 710, the MS 740, and the RS 750 carry out a procedure of providing the transparent relay service to the MS 740, that is, the general communication procedure. The RS 750 measures the RS-MS signaling level by monitoring the UL signal of the MS 740 in step 717. The UL signal can include the sounding signal or the UL message, and the code transmitted from the MS.

After measuring the RS-MS signaling level, the RS 750 sends the RS-MS signaling level measurement value to the BS 710 through the allocated UL area in step 719. The RS-MS signaling level measurement value transmitted to the BS 710 can be the RS_MS_Signal_Report message of Table 4 or the code sequence which combines the MS ID information and the RS-MS signaling measurement value.

In step 721, the BS 710 manages information relating to an MS which will receive transparent the relay service and information relating to the suitable RS by utilizing the signaling measurement result reported by the RS 750.

So far, explanations have described RS selection to support a transparent relay service to an MS in a multihop relay BWA communication system. A relay communication system which provides the transparent relay service to an MS will be discussed with reference to a BS, an RS, and an MS which constitute a BWA communication system. Since the BS, the RS, and the MS, having the same interface modules (communication modules), have a similar structure, the following explanation provides an operation of one of the BS, the RS, and the MS.

Figure 8:
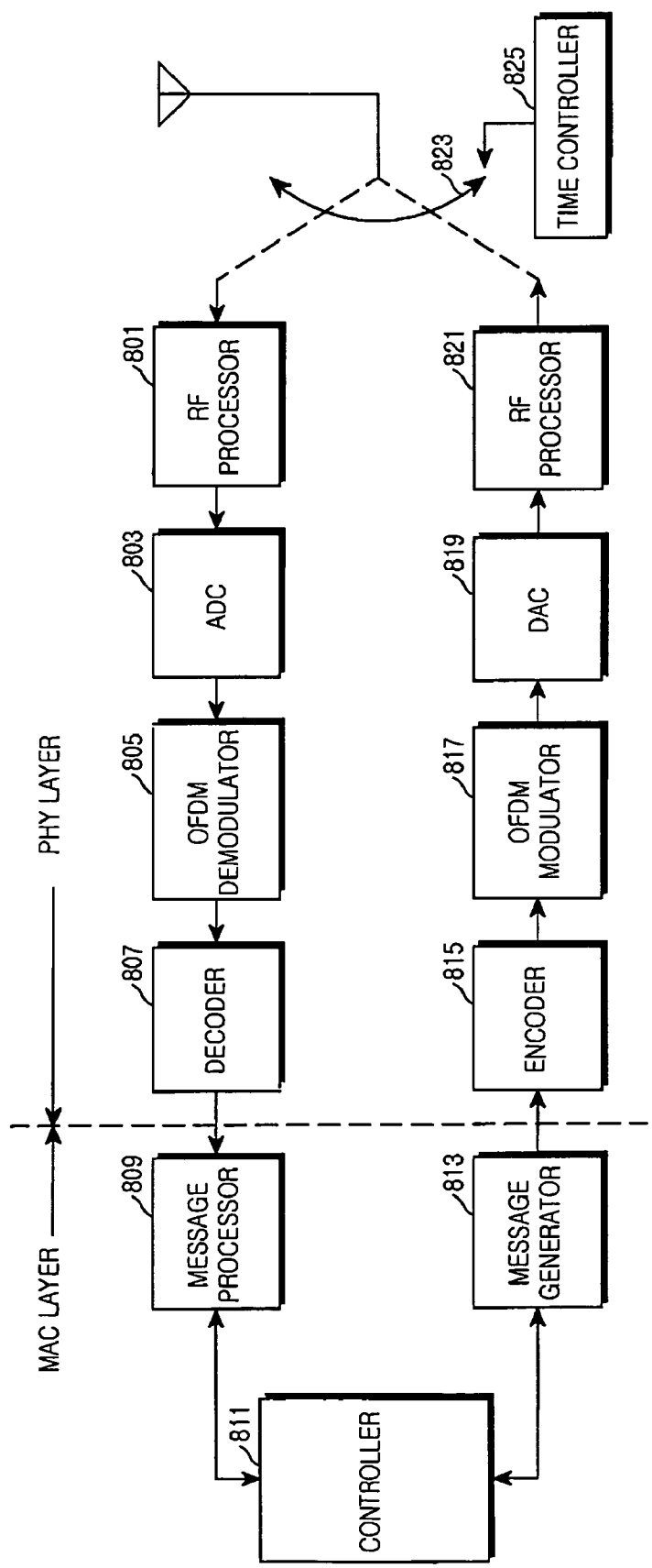
FIG. 8 is a block diagram of a BS (RS or MS) according to the present invention.

FIG. 8 shows a BS (RS or MS) according to the present invention. A Time Division Duplex-Orthogonal Frequency Division Multiple Access (TDD-OFDMA) system will now be described. The BS (RS or MS) in FIG. 8 includes a Radio Frequency (RF) processor 801, an Analog-to-Digital Converter (ADC) 803, an Orthogonal Frequency Division Multiplexing (OFDM) demodulator 805, a decoder 807, a message processor 809, a controller 811, a message generator 813, an encoder 815, an OFDM modulator 817, a Digital-to-Analog Converter (DAC) 819, a Radio Frequency (RF) processor 821, a switch 823, and a time controller 825.

The time controller 825 controls a switching operation of the switch 823 based on time synchronization. For instance, in a signal receiving interval, the time controller 825 controls the switch 823 to connect an antenna to the RF processor 801 of the receiving stage. In a signal transmitting interval, the time controller 825 controls the switch 823 to connect the antenna to the RF processor 821 of the transmitting stage.

In the receiving interval, the RF processor 801 transforms an RF signal received over the antenna to a baseband analog signal. The ADC 803 converts the analog signal from the RF processor 801 to sample data and outputs the sample data. The OFDM demodulator 805 Fast Fourier Transform (FFT)-processes the sample data from the ADC 803 to frequency domain data, selects and outputs data of subcarriers to be actually received from the frequency domain data.

The decoder 807 demodulates and decodes the data fed from the OFDM demodulator 805 according to a preset modulation level (MCS level).

The message processor 809 decomposes a control message fed from the decoder 807 and provides its result to the controller 811. The controller 811 performs a corresponding process for the information fed from the message processor 809. Also, the controller 811 generates and provides information to be transmitted to the message generator 813. The message generator 813 generates a message with the various information provided from the controller 811 and outputs the generated message to the encoder 815 of the physical layer.

The encoder 815 encodes and modulates the data fed from the message generator 813 according to the preset modulation level (MCS level). The OFDM modulator 817 outputs sample data (OFDM symbol) by Inverse Fast Fourier Transform (IFFT)-processing the data fed from the encoder 815. The DAC 819 converts the sample data to an analog signal and outputs the analog signal. The RF processor 821 transforms the analog signal of the DAC 819 to an RF signal and transmits the RF signal over the antenna.

In the above structure, the controller 811, which is a protocol controller, controls the message processor 809 and the message generator 813. That is, the controller 811 can function as the message processor 809 and the message generator 813. According to the present invention, the message processor 809 and the message generator 813 are separately provided to explain their respective functions. Hence, in the practical implementation, the controller 811 can be configured to process both or part of the message processor 809 and the message generator 813.

The controller 811 receives information for the protocol processing from the corresponding constituent of the physical layer, or issues a control signal to the corresponding constituent of the physical layer. For instance, the controller 811 is able to generate a control signal to control a subcarrier allocation scheme (or a subchannel allocation scheme) of the OFDM modulator 817 or receive received signal strength information (e.g., SINR, RSSI, etc.) from the physical layer.

Now, operations of the MS, the RS, and the BS according to the present invention are described based on the structure of FIG. 8. Hereinafter, a control message processing in the MAC layer is primarily explained.

Initially, as for the operation of the MS, the message processor 809 decomposes the control message received from the BS and provides its result to the controller 811. When receiving the UL-MAP message including the PAPR_Reduction_Safety_and_Sounding_Zone_Allocation_IE of Table 1 or the UL_sounding_Command_IE of Table 2, the message processor 809 extracts various control information from the received message and provides the extracted information to the controller 811.

Next, the controller 811 allocates the UL sounding channel zone using the control information contained in the messages of Table 1 and Table 2 and controls the operation to send the sounding signal in the sounding channel zone. More specifically, the controller 811 issues a sounding signal mapping control signal to the OFDM modulator 817, and the OFDM modulator 817 performs the OFDM modulation by mapping the sounding signal (e.g., pilot symbol) to the corresponding subcarriers (sounding channel zone) according to the control signal.

As for the operation of the RS, the message processor 809 decomposes the control message received from the MS or the BS and provides it's the decomposed result to the controller 811. Upon receiving the UL-MAP message including the PAPR_Reduction_Safety_and_Sounding_Zone_Allocation_IE of Table 1 or the UL_sounding_Command_IE of Table 2, the message processor 809 extracts various control information from the received message and provides the extracted control information to the controller 811.

Next, the controller 811 recognizes the UL sounding channel zone of the MS based on the control information contained in the messages of Table 1 and Table 2 and controls the operation to receive the sounding signal in the sounding channel zone. In more detail, the controller 811 issues a control signal to the OFDM demodulator 805 to receive the sounding signal from the MS.

The OFDM demodulator 805 extracts the subcarrier values, to which the sounding signal is mapped, according to the control signal, calculates the RS-MS signaling level using the extracted subcarrier values, and provides the calculated RS-MS signaling level to the controller 811. Next, the controller 811 provides the RS-MS signaling level measurement value reported from the physical layer, to the message generator 813.

The message generator 813 generates a message to be transmitted to the BS under the control of the controller 811, or generates a message to be transmitted to the MS managed by the RS and provides the generated message to the physical layer. According to the present invention, the message generator 813 generates the RS_MS_Signal_Report message of Table 4 using the RS-MS signaling level measurement value fed from the controller 811 and provides the generated message to the physical layer. Also, the message generator 813 is able to generate the band allocation request message (see Table 5) to send the RS_MS_Signal_Report message.

The message generated at the message generator 813 is processed to a transmittable form in the physical layer and is then transmitted over the antenna.

As for the operation of the BS, the message generator 813 generates a message to be transmitted to the MS or the RS under the control of the controller 811 and provides the generated message to the physical layer. According to the present invention, to request the sounding signal transmission to the MS, the UL-MAP message including the PAPR_Reduction_Safety_and_Sounding_Allocation_IE of Table 1 or the UL_Sounding_Command_IE of Table 2 is generated and provided to the physical layer. Also, to request the RS-MS signaling level measurement value to the RS, the message generator 813 generates and provides the UL-MAP message including the RS_MS_Signal_Report_IE of Table 3 to the physical layer.

The message generated at the message generator 813 is processed to a transmittable form in the physical layer and is then transmitted over the antenna.

After sending the sound signal transmission request message to the MS, the controller 811 controls the operation to receive the sounding signal in the sounding channel zone allocated to the MS. More specifically, the controller 811 issues a control signal to receive the sounding signal from the MS, to the OFDM demodulator 805.

Next, the OFDM demodulator 805 extracts the subcarrier values, to which the sounding signal is mapped, according to the control signal, calculates the BS-MS signaling level using the extracted subcarrier values, and provides the calculated BS-MS signaling level to the controller 811.

The message processor 809 decomposes the control message received from the MS or the RS and provides its result to the controller 811. According to the present invention, when receiving the RS_MS_Signal_Report message (see Table 4) or the RS-MS signal report extended subheader (see Table 5) from the RS, various information is extracted from the received message and provided to the controller 811. In doing so, the RS-MS signaling level measurement value received from the RS is provided to the controller 811.

Next, the controller 811 selects a suitable RS for the MS using the RS-MS signaling level measurement value reported from the physical layer and the RS-MS signaling level measurement value from the message processor 811.

As set forth above, in a multihop relay BWA communication system of the present invention, an RS recognizes a sounding signal transmitted from an MS which communicates directly with a BS, measures and reports an RS-MS channel status to the BS. Therefore, advantageously, the BS can select a suitable RS for the MS by taking into account the RS-MS channel status. In other words, the service can be provided at a high effective transmission rate in a good radio channel. Furthermore, since the MS does not have to separately recognize the presence or the information of the RS, the transparent relay service can be provided.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A communication method of a Base Station (BS) in a wireless communication system using a multihop relay scheme, the method comprising:
   allocating an uplink channel to a Mobile Station (MS) in a resource allocation message sent by the BS;
   obtaining allocated channel identity information of the MS by capturing the resource allocation message, at least one Relay Station (RS);
   measuring an RS-MS signaling level at each of the at least one RS from an uplink signal received at each of the at least one RS from the MS in the allocated uplink channel, based on information of the allocated uplink channel that is acquired from the BS, wherein the at least one RS and the MS are not associated;
   measuring a BS-MS signaling level at the BS using the uplink signal from the MS, the uplink signal being received in the allocated uplink channel;
   receiving, at the BS, RS-MS signaling level information reported by the at least one RS; and
   selecting an RS for providing transparent relay services to the MS using the multihop relay scheme, wherein the selected RS corresponds to a strong signaling level of both the BS-MS signaling level and the RS-MS signaling level;
   wherein the wireless communication system comprises an Orthogonal Frequency Division Multiplexing (OFDM)/Orthogonal Frequency Division Multiple Access (OFDMA) system.

2. The communication method of claim 1, wherein the RS-MS signaling level information includes at least one of message type information, a number of reported MSs, an IDentifier (ID) of the MS, and the RS-MS signaling level measurement value.

3. The communication method of claim 1, wherein the RS-MS signaling level information is a form of a Media Access Control (MAC) message or a code sequence which combines the MS ID and the signaling level measurement value.

4. The communication method of claim 1, wherein the signaling level is at least one of a Signal to Interference and Noise Ratio (SINR) value and a Received Signal Strength Indicator (RSSI) value.

5. The communication method of claim 1, wherein the receiving step comprises:
   allocating a contention free uplink (UL) area for at least one RS; and
   receiving the RS-MS signaling level information in the allocated UL area.

6. The communication method of claim 5, wherein a message for allocating the UL area includes at least one of an Extended 2-Uplink Interval Usage Code (UIUC) value, an ID of the RS, and allocation resource information.

7. The communication method of claim 1, wherein the receiving step comprises:
   sending a bandwidth polling to the at least one RS;
   receiving a band request header from the at least one RS;
   allocating an UL area to at least one RS which transmits the band request header; and
   receiving the RS-MS signaling information value in the allocated UL area.

8. The communication method of claim 7, wherein the band request header includes a plurality of MSs to be reported to by a corresponding RS.

9. The communication method of claim 1, wherein the receiving step comprises:
   receiving a band request code from at least one RS;
   allocating an UL area to an RS which transmits the band request code; and
   receiving an RS-MS signaling level information in the allocated UL area.

10. The communication method of claim 1, further comprising:
    sending information of the MS to the selected RS;
    allocating an uplink (UL) area to the selected RS to receive RS-MS signaling level information;
    providing a transparent relay service to the MS via the selected RS; and
    periodically receiving RS-MS signaling level information in the allocated UL area.

11. A communication method of a Relay Station (RS) in a wireless communication system using a multihop relay scheme, the method comprising:
    acquiring information of an uplink channel allocated to a Mobile Station (MS) by a Base Station (BS) by analyzing a received resource allocation message broadcast from the BS;
    measuring an RS-MS signaling level using an uplink signal from the MS, the uplink signal being received in the uplink channel allocated to the MS by the BS, wherein the at least one RS and the MS are not associated;
    reporting the RS-MS signaling level information to the BS for selection of an RS, at the BS, for providing transparent relay services to the MS using the multihop relay scheme using a BS-MS signaling level and the RS-MS signaling level; and receiving a message from the BS indicating the RS is providing relaying messages from the MS;
wherein the wireless communication system comprises an Orthogonal Frequency Division Multiplexing (OFDM)/Orthogonal Frequency Division Multiple Access (OFDMA) system.

12. The communication method of claim 11, wherein the RS-MS signaling level information includes at least one of message type information, a number of reported MSs, an MS IDentifier (ID), and the RS-MS signaling level measurement value.

13. The communication method of claim 11, wherein the signaling level information is a form of a Media Access Control (MAC) message or a code sequence which combines an MS ID and a signaling level measurement value.

14. The communication method of claim 11, wherein the signaling level is one of an Signal to Interference and Noise Ratio (SINR) value and a Received Signal Strength Indicator (RSSI) value.

15. The communication method of claim 11, wherein the reporting step comprises:
   receiving a contention free uplink (UL) area allocated by a BS; and
   sending the signaling level information to the BS in the allocated UL area.

16. The communication method of claim 15, wherein a message for allocating the UL area includes at least one of an Extended 2-Uplink Interval Usage Code (UIUC) value, an RS ID, and resource information.

17. The communication method of claim 11, wherein the step of reporting comprises:
   receiving a bandwidth polling from the BS;
   sending a band request header to the BS;
   receiving an UL area allocated by the BS; and
   sending the RS-MS signaling level information to the BS in the allocated UL area.

18. The communication method of claim 17, wherein the band request header includes a number of MSs to be reported by a corresponding RS.

19. The communication method of claim 11, wherein the step of reporting comprises:
   sending a band request code to the BS;
   receiving an UL area allocated by the BS; and
   sending the RS-MS signaling level information to the BS in the allocated UL area.

20. The communication method of claim 11, further comprising:
   receiving information relating to an MS to be relay-serviced by the RS from the BS;
   providing a transparent relay service to the MS; and
   periodically measuring the RS-MS signaling level during the relay service and reporting the measured RS-MS signaling level to the BS.

21. A communication method in a wireless communication system using a multihop relay scheme, the method comprising:
   acquiring, at least one Relay Station (RS), information of an uplink channel allocated to a Mobile Station (MS) by a Base Station (BS) by analyzing a received resource allocation message broadcast from the BS;
   measuring, at the BS, a BS-MS signaling level using an uplink signal from the MS, the uplink signal received in the uplink channel;
   measuring, at the at least one RS, an RS-MS signaling level using the uplink signal from the MS, the uplink signal received in the uplink channel allocated to the MS by the BS, wherein the at least one RS and the MS are not associated;
   reporting, at the at least one RS, the RS-MS signaling level information to the BS; and
   selecting, at the BS, an RS for providing transparent relay services to the MS using the multihop relay scheme, wherein the selected RS corresponds to a strong signaling level of both the BS-MS signaling level and at least one RS-MS signaling level reported from the at least one RS;
   wherein the wireless communication system comprises an Orthogonal Frequency Division Multiplexing (OFDM)/Orthogonal Frequency Division Multiple Access (OFDMA) system.

22. The communication method of claim 21, wherein the RS-MS signaling level information includes at least one of message type information, at least one reported MS, an MS ID, and the at least one RS-MS signaling level measurement value.

23. The communication method of claim 21, wherein the RS-MS signaling level information is a form of a Media Access Control (MAC) message or a code sequence which combines an MS ID and a signaling level measurement value.

24. The communication method of claim 21, wherein the signaling level is one of a Signal to Interference Noise Ratio (SINR) value or a Received Signal Strength Indicator (RSSI) value.

25. A communication apparatus in a wireless communication system using a multihop relay scheme, the apparatus comprising:
   at least one Relay Station (RS) configured to
   capture a resource allocation message containing information of an uplink channel allocated to a Mobile Station (MS) by a Base Station (BS),
   obtain allocated channel identity information of the MS,
   measure an RS-MS signaling level using an uplink signal from the MS, the uplink signal received in the uplink channel allocated to the MS by the BS while not being associated with the MS, and
   report the RS-MS signaling level to the BS; and
   the BS for measuring a BS-MS signaling level using the uplink signal from the MS, the uplink signal received in the uplink channel allocated to the MS by the BS, and selecting an RS for providing transparent relay services to the MS using the multihop relay scheme, wherein the selected RS corresponds to a strong signaling level of both a BS-MS signaling level and an RS-MS signaling level reported from the at least one RS;
   wherein the wireless communication system comprises an Orthogonal Frequency Division Multiplexing (OFDM)/Orthogonal Frequency Division Multiple Access (OFDMA) system.

26. The communication apparatus of claim 25, wherein the RS-MS signaling level information includes at least one of message type information, a number of at least one reported MS, an MS ID, and the at least one RS-MS signaling level measurement value.

27. The communication apparatus of claim 25, wherein the RS-MS signaling level information is a form of a Media Access Control (MAC) message or a code sequence which combines an MS ID and a signaling level measurement value.

28. The communication apparatus of claim 25, wherein the signaling level is one of a Signal to Interference Noise Ratio (SINR) value and a Received Signal Strength Indicator (RSSI) value.

* * * * *